United States Patent
Douglas et al.

(10) Patent No.: US 8,505,496 B2
(45) Date of Patent: Aug. 13, 2013

(54) METHOD FOR BURNING COAL USING OXYGEN IN A RECYCLED FLUE GAS STREAM FOR CARBON DIOXIDE CAPTURE

(75) Inventors: Mark Austin Douglas, Ottawa (CA); Yewen Tan, Ottawa (CA); Thomas Sellers, Buckingham (CA); Eddy Chui, Kanata (CA); Adrian Majeski, Carleton Place (CA)

(73) Assignee: Her Majesty the Queen in Right of Canada as Represented by the Minister of Natural Resources, Ontario (CA)

( * ) Notice: Subject to any disclaimer, the term of this patent is extended or adjusted under 35 U.S.C. 154(b) by 723 days.

(21) Appl. No.: 12/600,517

(22) PCT Filed: May 18, 2007

(86) PCT No.: PCT/CA2007/000890
§ 371 (c)(1),
(2), (4) Date: May 3, 2010

(87) PCT Pub. No.: WO2008/141412
PCT Pub. Date: Nov. 27, 2008

(65) Prior Publication Data
US 2010/0236500 A1  Sep. 23, 2010

(51) Int. Cl.
*F23C 10/20* (2006.01)

(52) U.S. Cl.
USPC .......................................... 122/4 D; 110/261

(58) Field of Classification Search
USPC .................. 122/4 D, 10, 22, 7 R, 6 R; 431/9,
431/237, 242; 110/245, 345, 261, 263
See application file for complete search history.

(56) References Cited

U.S. PATENT DOCUMENTS

| | | | |
|---|---|---|---|
| 2,847,979 A | | 8/1958 | Sifrin et al. |
| 4,412,810 A | * | 11/1983 | Izuha et al. ................... 431/186 |
| 4,556,384 A | * | 12/1985 | Laurenceau et al. .......... 431/160 |
| 4,928,605 A | | 5/1990 | Suwa et al. |
| 5,038,722 A | * | 8/1991 | Zhao ............................... 122/22 |
| 5,231,937 A | * | 8/1993 | Kobayashi et al. ........... 110/262 |
| 5,309,850 A | | 5/1994 | Downs et al. |
| 5,626,088 A | * | 5/1997 | Hiltunen et al. .............. 110/243 |

(Continued)

FOREIGN PATENT DOCUMENTS
WO  9855803 A1  12/1998

OTHER PUBLICATIONS
ISR PCT/CA2007/000890, pp. 2-5, dated Feb. 15, 2008.

*Primary Examiner* — Gregory A Wilson
(74) *Attorney, Agent, or Firm* — Abelman, Frayne & Schwab

(57) ABSTRACT

A method of introducing oxygen into a boiler system for combustion with a prepared fuel in a furnace combustion chamber comprises providing a plurality of swirl-inducing elements to the air stream delivery lines, and a plurality of oxygen delivery jets adjacent the intake region and substantially surrounding the air stream delivery lines; igniting the fuel gas to create a flame; and delivering a stream of oxygen through the jets tangentially to the flame envelope to substantially shape and stabilize a swirling flow field for the flame, the oxygen concentration in the flame envelope gradually increasing towards an outer periphery of the flame envelope. A boiler system for using the method can be a new system or a retrofit to an existing system. The method and system provide advantages in reduced environmental impact and increased efficiency while addressing the safety factors involved in introducing oxygen to boiler systems.

12 Claims, 6 Drawing Sheets

(56) References Cited

U.S. PATENT DOCUMENTS

| | | | |
|---|---|---|---|
| 5,829,369 A * | 11/1998 | Sivy et al. | 110/347 |
| 5,871,343 A | 2/1999 | Baukal et al. | |
| 6,085,674 A * | 7/2000 | Ashworth | 110/347 |
| 6,116,171 A * | 9/2000 | Oota et al. | 110/263 |
| 6,202,574 B1 | 3/2001 | Liljedahl et al. | |
| 6,601,541 B2 * | 8/2003 | Burdis et al. | 122/4 D |
| 6,935,251 B2 | 8/2005 | Marin et al. | |
| 6,978,726 B2 | 12/2005 | Kobayashi et al. | |
| 2004/0194681 A1 | 10/2004 | Taylor | |
| 2005/0132941 A1 | 6/2005 | Taylor | |
| 2006/0201405 A1 | 9/2006 | Devault et al. | |

* cited by examiner

METHOD FOR BURNING COAL USING OXYGEN IN A RECYCLED FLUE GAS STREAM FOR CARBON DIOXIDE CAPTURE

FIELD OF THE INVENTION

This invention is concerned with the modification of coal fired boilers, for example those used in an electricity generating station, so as to use oxygen-fuel firing methods in order to create a flue gas stream that is rich in carbon dioxide, so that the carbon dioxide can be recovered for utilization or sequestration. The modifications proposed in this invention can be incorporated either in new construction boilers, or they can be retrofitted to existing boilers.

BACKGROUND OF THE INVENTION

According to current technology, the most basic approach for using oxygen to burn coal accepts the high flame temperatures produced and arranges the furnace to remove the coal ash constituents as a running slag. This approach is impractical to retrofit to most pulverized coal furnaces which are configured to maintain the coal ash constituents above the ash softening temperature; hence they are known as dry-bottom furnaces.

The current technology seeks to implement oxygen-coal combustion in dry-bottom furnaces by controlling the oxygen-fuel flame so as to maintain peak flame temperatures close to those experienced under normal conditions when coal is burned in air. This ensures that the slagging and fouling behaviour of the coal ash constituents is maintained such that the deposits in the furnace and various heat transfer surfaces of the boiler can be removed effectively using conventional removal techniques.

The current art of oxygen-fuel combustion favours recycling large quantities, for example over 50%, of the total products of combustion in order to accomplish the above mentioned flame control. This recycling of relatively cold flue gases to the furnace also helps to maintain the flue gas weight through the boiler close to that experienced under normal conditions when coal is burned in air, thereby maintaining adequate convective heat transfer to the boiler surfaces.

The current technology used for oxygen-fuel combustion favours the pre-mixing of oxygen into the flue gas stream delivered to the furnace in order to convey the oxygen to the flame. This approach necessarily considers pre-mixing oxygen into several streams, such as the primary stream used to dry and convey the coal to the furnace, a secondary stream used by the burner and finally a tertiary stream used by the burner and/or over-fire system if separate from the burner.

An important safety consideration when pre-mixing oxygen with these various known flue gas streams is the desirability of maintaining the oxygen concentration below 28% by volume (dry basis), and preferably of maintaining the oxygen concentration below 25% in order to provide a safety margin for operational upsets. Achieving a 25% oxygen concentration when constrained to pre-mixing all of the oxygen required leads to yet another reason for recirculating relatively large quantities of cold flue gas to the furnace.

The current techniques of oxygen-fuel combustion can be improved by choosing to introduce a component of the total oxygen demand directly at the burner in relatively pure form. This approach however, is complicated by the interaction of the oxygen jets so created with and within the flame envelope. While the use of relatively high momentum oxygen jets to induce recirculation patterns near the burner and in the furnace may be of interest for firing gaseous and liquid fuels, or even solid fuels of exceptional quality, defined as having low ash content and high volatile content, the use of such oxygen jets in dry bottom pulverized coal fired furnaces can work against the flow field established in the furnace by the action of the burners in such a way as to create poor combustion and unsuitable accumulation patterns for the coal ash constituents both on the burner and on the furnace walls in general.

To summarize, the current technology of oxygen-fuel combustion incurs significant complexity and cost to retrofit an existing boiler in order to recirculate relatively large quantities of cold flue gas to the furnace, in particular for conditioning and transporting the flue gas stream that is recycled to the furnace for the purpose of acting as the oxygen carrier stream. Conditioning of this flue gas stream is necessary to remove particulates, to cool the flue gas stream in order to preserve the operation of the air-heaters and to be able to move the recycled stream through existing ductwork.

The current art of oxygen-fuel combustion also requires that significant modifications be made to the existing combustion system, including but not limited to; modifying the burners to establish proper flow areas, arranging for premixing the oxygen into the required streams and incorporating any oxygen jets that may be required into the system.

In order to overcome these difficulties with the known systems, this invention proposes a new configuration for an oxygen-fuel combustion system, which is both relatively simple and easily incorporated into new or existing boilers in an economical manner. The concept includes a preferred process configuration, a preferred method for introducing oxygen to the furnace and a preferred method of introducing coal to the furnace. This invention therefore seeks to provide a new process for oxygen-fuel combustion using a novel method of introducing oxidant and fuel to the furnace.

SUMMARY OF THE INVENTION

This invention therefore seeks to provide a method to retrofit oxygen-fuel firing to existing register style burners with a minimum of changes, while preserving the essential function of such burners to stabilize the flame using swirl.

According to one aspect of this invention, in the preferred method, fuel and oxidant can be added separately or in combination. In a further aspect of this invention, the method can also be applied to new burners.

An important aspect of this invention is to be able to manage the introduction of oxygen to the furnace in order to create an oxygen gradient that increases from a minimum at the core of the flame to a maximum outside the flame envelope and along the burner walls adjacent to the burner.

In a first broad embodiment, the invention therefore seeks to provide a method of introducing oxygen into a boiler system for combustion with a prepared fuel, the boiler system including a furnace comprising a combustion chamber having an outside wall with an intake region, at least one burner, a prepared fuel delivery means connected to the intake region, and a plurality of air stream delivery lines connected to the intake region adjacent and at least partly surrounding the prepared fuel delivery means, to provide a stream of flue gas, the method comprising (a) providing a plurality of swirl-inducing elements to the air stream delivery lines;
(b) providing a plurality of oxygen delivery jets adjacent the intake region and substantially surrounding the air stream delivery lines;
(c) igniting the fuel to create a flame having a flame envelope;
(d) delivering a stream of oxygen through the jets tangentially to the flame envelope such that (i) the stream of oxygen substantially shapes and stabilizes a swirling flow field for the flame; and (ii) the oxygen concentration in the flame envelope gradually increases towards an outer periphery of the flame envelope.

In a second broad embodiment, the invention seeks to provide boiler system for combustion of oxygen with a prepared fuel, the boiler system having a furnace comprising (i) a combustion chamber having an outside wall with an intake region, at least one burner;

(ii) a prepared fuel delivery means connected to the intake region, and a plurality of air stream delivery lines connected to the intake region adjacent and at least partly surrounding the prepared fuel delivery means, constructed and arranged to provide a stream of flue gas to create a flame envelope when ignited;

(iii) a plurality of swirl-inducing elements to the air stream delivery lines; and (iv) a plurality of oxygen delivery jets adjacent the intake region and substantially surrounding the air stream delivery lines, constructed and arranged to deliver oxygen tangentially to, but within an outer periphery of, the flame envelope to substantially shape and stabilize a swirling flow field for the flame, wherein the oxygen concentration in the flame envelope gradually increases towards the outer periphery.

Preferably the furnace comprises a quarl region having a quarl surface, and the jets are provided at the quarl surface.

Any suitable fuel can be used, but the method of the invention is particularly suited to use with pulverized coal delivered from a pulverizer. In such case, preferably the pulverized coal is introduced to the furnace in a mixture with a carrier liquid having an evaporation point such that its latent heat of evaporation contributes to tempering of the flame; and preferably such carrier liquid is selected from a water-based liquid or a carbon dioxide-based liquid and comprises condensates derived from the operation of the furnace.

Preferably, the air stream delivery lines comprise primary, secondary and tertiary lines, and step (a) of the method of the invention comprises delivery of an oxygen deficient stream to the primary line, an oxygen enriched stream to each of the secondary and tertiary lines and pure oxygen to the quarl.

For start-up or part-load operation, the method of the invention can further comprise the preliminary step of delivering a stream of an auxiliary fuel; and the ignition step (c) comprises igniting the auxiliary fuel in air, and gradually introducing the coal to replace the auxiliary fuel.

Pursuant to the method of the invention, it is advantageous to selectively stop feeding coal to the pulverizer and substantially simultaneously stop delivery of oxygen to the quarl surface and deliver an oxygen deficient stream of a recirculated flue gas mixture to clear the pulverizer.

BRIEF DESCRIPTION OF THE DRAWINGS

The benefits and advantages of the present invention will become more readily apparent to those of ordinary skill in the relevant arts after reviewing the following detailed description and the accompanying drawings wherein.

DETAILED DESCRIPTION OF THE DRAWINGS

Figure 1:
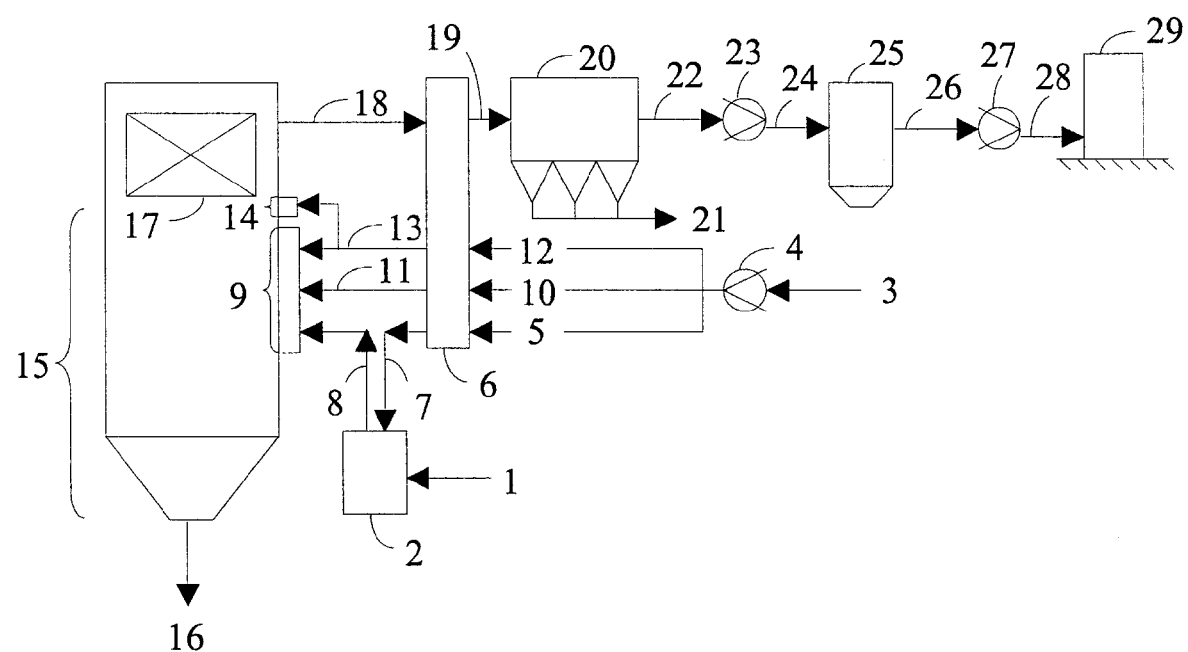
FIG. 1 is a schematic diagram of a conventional pulverized coal fired boiler system.

Referring first to FIG. 1, which is a schematic diagram of a conventional pulverized coal fired boiler system, coal 1 is added to one or more pulverizers 2, which are also fed with a portion of the total air stream 3 which is fed to the boiler by at least one fan 4. The portion of the total air stream directed to the pulverizers 2, known as the primary air stream 5, is heated by the air heaters 6 before being directed through input line 7 to the pulverizers 2 in order to effect the drying of the coal during the size reduction process in the pulverizers 2. The pulverized and dried coal is then transported in line 8 to one or more burners, shown here as burners 9. The combined stream in line 8 also contains any moisture that is driven off the coal during the drying process in the pulverizers 2.

This description of a conventional pulverized coal fired boiler system is typical of design and construction, but other designs and constructions are known and used which differ in orientation, disposition and components.

The burners 9 are also supplied directly with a portion of the total air stream 3 which is fed to the boiler by fans 4. This portion of the total air stream 3, is known as the secondary air stream 10, and is heated by the air heaters 6 before being directed in line 11 to the burners 9 in order to stabilize and effect the combustion of the coal.

The process of combustion is completed by a third portion of the total air stream 3 which is fed to the boiler by fans 4. This portion of the total air stream 3 is known as the tertiary air stream 12 and is heated by the air heaters 6 before being directed in line 13 to the burners 9 and/or one or more overfire registers 14. The burners 9 and overfire registers 14 are in communication with the combustion chamber 15, which together may be referred to as the furnace.

The combustion process is substantially completed within the combustion chamber 15 after which the products of combustion, consisting of flue gases, ash particles and any remaining unburned fuel constituents, pass through the boiler heat exchange surfaces 17 before leaving the boiler envelope in line 18. A portion of the boiler ash is removed from the combustion chamber 15 directly in line 16.

The overfire registers 14 may be integral or separated from the burners 9, depending on the degree of staging of the combustion process, such staging being beneficial to the reduction of the emission of nitrogen oxide compounds.

The products of combustion leaving the boiler envelope are directed in line 18 to the air heaters 6 in order to exchange heat with the incoming primary 5, secondary 10 and tertiary 12 air streams. The air heaters 6 thus serve three important functions. First, they improve the boiler thermal efficiency by reducing the heat lost by discharging the products of combustion to the atmosphere. Second, they help to stabilize the flame in the furnace by serving to pre-heat the secondary air stream 10 passing into line 11. Third, they provide the primary means of drying the incoming coal 1 by serving to pre-heat the primary air stream 5, which passes into line 7. The function of the air heaters 6 is therefore critical to the efficient operation of the boiler and must be preserved or replaced during any retrofit of the boiler.

Upon leaving the air heaters 6, the products of combustion are directed by line 19 to the fly ash collection system 20, which may employ aerodynamic, mechanical and/or electrostatic particle removal mechanisms. The particulates so removed are recovered in line 21. The products of combustion are removed from the fly ash collection system 20 in line 22 by the action of a flue gas fan 23.

In some cases, the products of combustion are directed in line 24 to further flue gas cleaning equipment 25 in order to remove sulfur, nitrogen and/or mercury compounds.

Finally, the resulting flue gas stream is directed by line 26 to a flue gas fan 27 which discharges through line 28 to a stack 29 that discharges the flue gas stream to the atmosphere.

Figure 2:
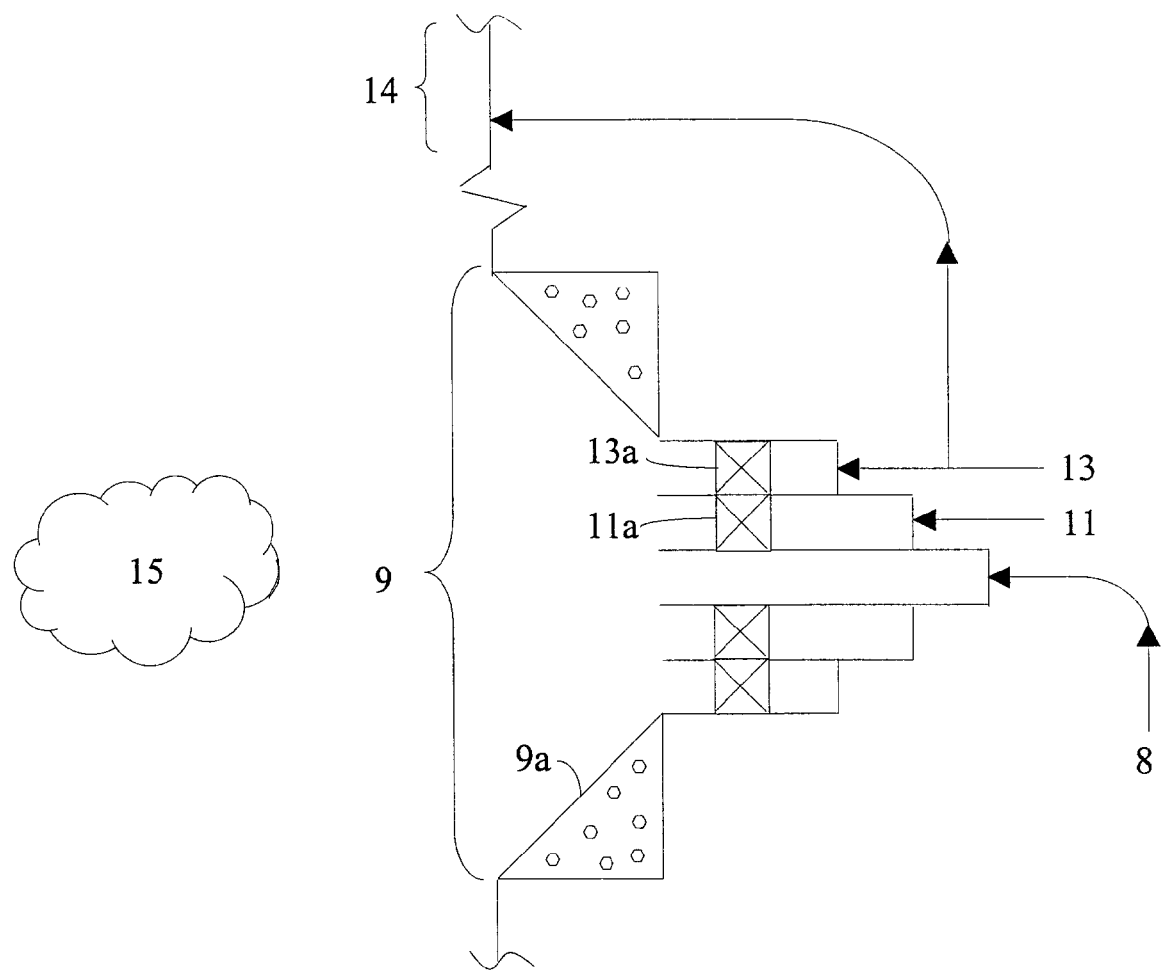
FIG. 2 is a schematic diagram of a round burner used in the boiler system of FIG. 1.

Referring now to FIG. 2, the construction of the burners 9 of Figure one is shown in more detail.

A cross section of a furnace wall local to a conventional round burner 9 is shown in order to illustrate the typical features of a round burner designed to burn coal in air. The primary air stream 8 carrying the pulverized and dried coal 1 is introduced to the burner 9 along the central axis of the burner in an axial direction towards the interior of the furnace 15.

The pre-heated secondary air stream 10 carried in line 11 is introduced to an annular section of the burner 9 containing a swirl inducing device 11a in order to effect a rotating motion of the secondary air stream 10 about the central axis of the burner 9, such motion being beneficial to the aerodynamic stabilization of the flame local to the burner 9.

The pre-heated tertiary air stream 12 carried in line 13 may be introduced to an annular section of the burner containing a swirl inducing device 13a in order to effect a rotating motion of the tertiary air stream 12 about the central axis of the burner 9 to assist with the staging and completion of the combustion process such that the formation of nitrogen oxide compounds is controlled. A portion of the tertiary air stream 12 may also be directed downstream of the burner 9 for injection into the furnace through the overfire registers 14 for the same general purpose.

The burner 9 may include a quarl 9a, which is lined with refractory material to reflect and retain heat, such an effect being beneficial to the thermal stabilization of the flame local to the burner 9.

The above description is of a typical construction; however, many variations are known and practiced by those familiar with this art, without affecting the general operation of these conventional burners. Such variations include alteration of the direction and intensity of the swirling components, the relative distribution of the total air requirements to each of the primary, secondary and tertiary streams and finally the degree of separation of the overfire registers 14 and the burners 9.

Figure 3:
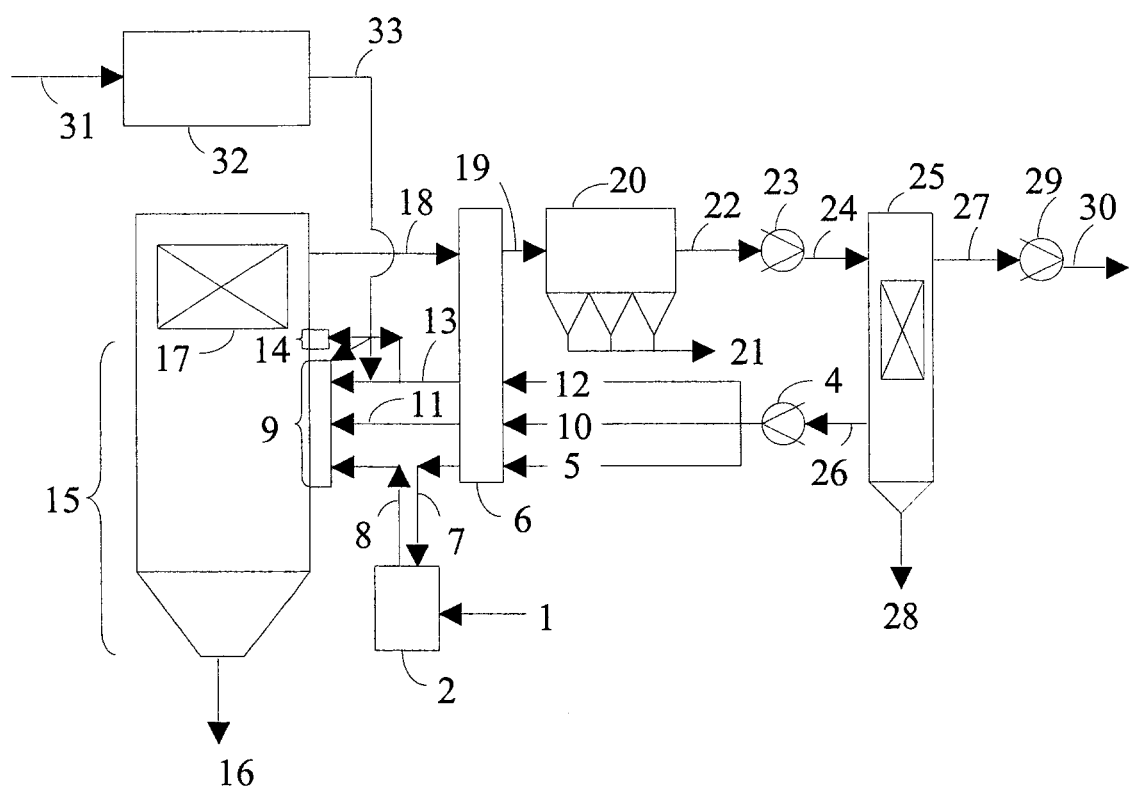
FIG. 3 is a schematic diagram of an oxygen-fuel retrofit of a conventional coal fired boiler system in which round burners are used.

Referring now to FIG. 3, this is a schematic diagram of an oxygen-fuel adaptation of a conventional pulverized coal fired boiler system according to the invention, such adaptation being intended for new construction or retrofit applications. Coal 1 is added to the pulverizers 2, which are fed with a portion of the total products of combustion available at stream 22 which is recovered by fans 23 and directed through line 24 to the condensing heat exchanger 25. The purpose of the condensing heat exchanger 25 is to cool and condition the flue gas stream 22, where such a conditioning process or processes may involve one or more of the following: removal of water vapour, removal of fine particulates, and removal of gaseous pollutants such as nitrogen oxides, sulfur oxides, and mercury compounds. Once cleaned and cooled sufficiently to condense most of the water vapour present, the resulting flue gas stream is low in oxygen concentration (generally less than 6%) and approaches ambient temperature. The resulting flue gas stream is then divided into first and second gaseous fraction streams 26, 27 and a liquid/solids fraction 28.

This description of the condensing heat exchanger is of the typical construction, but other variations are known and practiced by those familiar with this art, such as in the use of chemical scrubbing agents and/or disposition of the heat exchange surfaces and internals to promote the processes of condensation and scrubbing.

From the heat exchanger 25, the first gaseous fraction stream 26 of the flue gas stream is removed by fan 4 and directed back to or recycled to the boiler, while second gaseous fraction stream 27 is recovered by fan 29 and directed through line 30 to the product recovery train for further use, storage and/or sequestration. The portion of the recycled products of combustion that is directed to the pulverizers 2 is known as the primary recycle stream 5, and is pre-heated by the air heaters 6 before being directed in line 7 to the pulverizers 2 in order to effect the drying of the coal during the size reduction process in the pulverizers 2. The pulverized and dried coal is then transported in line 8 to the burners 9. The combined stream in line 8 also contains the moisture that is driven off the coal during the drying process in the pulverizers 2.

The burners 9 are also supplied with a second portion of the recycled products of combustion which is fed to the boiler by fans 4. This portion of the recycled products of combustion is known as the secondary recycle stream 10, and is pre-heated by the air heaters 6 before being directed in line 11 to the burners 9 in order to stabilize and effect the combustion of the coal.

The process of combustion is completed by a third portion of the recycled products of combustion which is fed to the boiler by fans 4. This portion of the recycled products of combustion is known as the tertiary recycle stream 12, and is pre-heated by the air heaters 6 before being directed in line 13 to the burners 9.

The structure and operation of the combustion chamber 15 and the subsequent processing of the products of combustion, up to the return to the heat exchanger 25, are substantially as described above in relation to FIG. 1.

It can now be understood that FIG. 3 differs from FIG. 1 with respect to how oxygen is admitted to the flame. Comparing FIG. 3 to FIG. 1 it can be seen that in the method of the invention, a preferred method of introducing the oxygen to the flame originates with ambient air being drawn into the process through stream 31 to an air separation plant 32 to produce a separated stream of relatively pure oxygen 33. This stream of oxygen is typically greater than 90% oxygen by volume with the balance being composed of nitrogen and other trace constituents which may be present in ambient air such as argon.

The production of the separated oxygen stream 33 is performed by conventional cryogenic separation means, or any other suitable separation techniques which may be commercially available.

Referring again to FIG. 3, the resulting oxygen stream 33 is directed to the burners 9 and overfire registers 14, but not to the primary recycle stream 5 passing through lines 7 and 8.

Figures 4A, 4B:
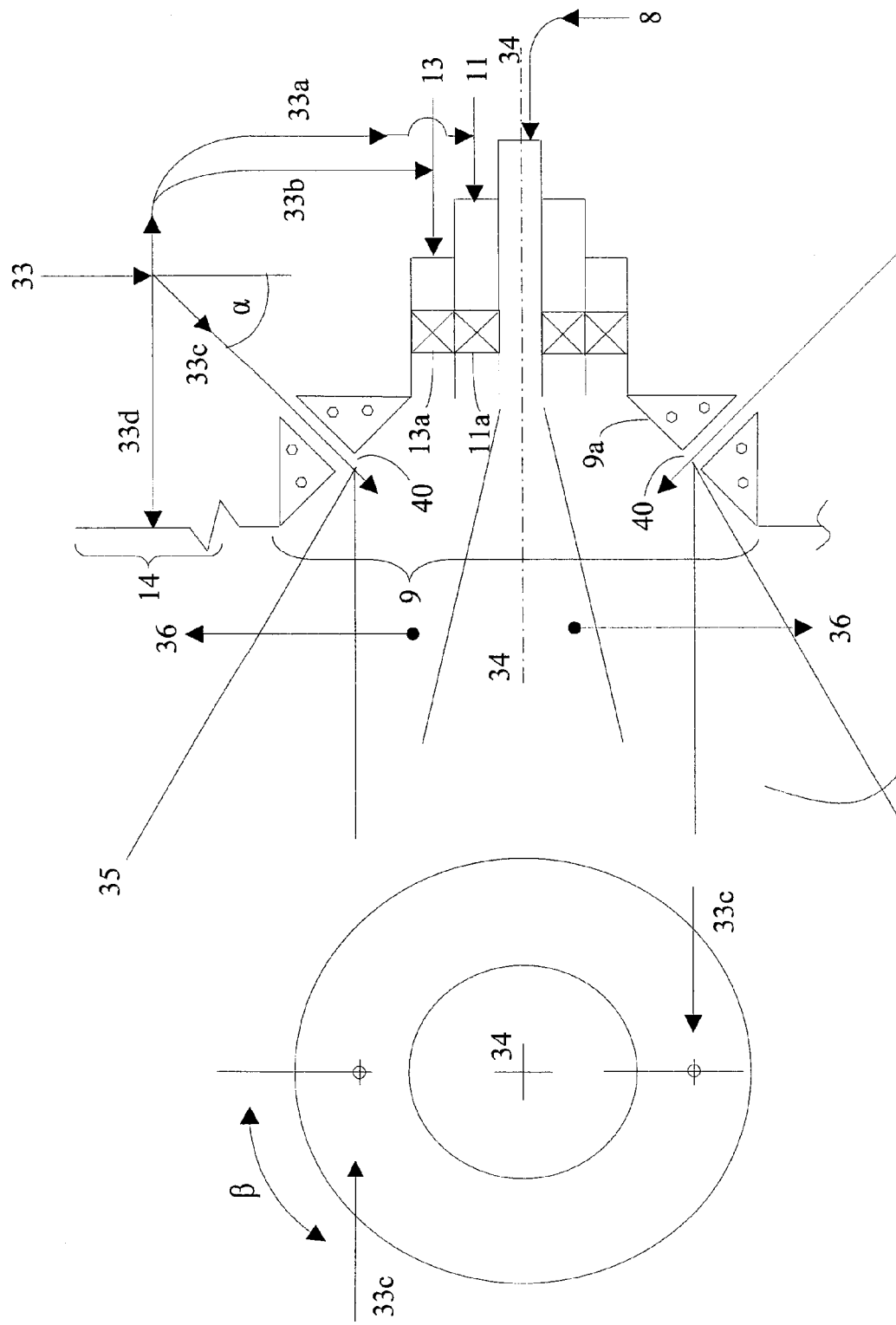
FIGS. 4A is a schematic diagram of a round burner used in the retrofitted boiler of FIG. 3.
FIG. 4B is a sectional view of the burner of FIG. 4A.

Referring now to FIGS. 4A and 4B, a preferred construction for the modified burner used in the furnace of FIG. 3 is shown schematically. Comparison of FIGS. 4A and 4B with FIG. 2 shows that there are many similarities between these figures. For simplicity only the additional features of FIGS. 4A and 4B will be described herein.

Referring to FIG. 4A which shows a section of a preferred construction for the modified burner in FIG. 3, it can be seen that the oxygen stream 33 is divided into separate streams 33a, 33b, 33c and 33d, the distribution being determined by the specific oxygen management strategy. Oxygen stream 33a is mixed into the secondary recycle stream 10 in line 11. Oxygen stream 33b is mixed into the tertiary recycle stream 12 in line 13. Oxygen stream 33c is introduced to the furnace directly, without mixing into a particular component of the recycle stream, through a multiplicity of openings in the burner throat area. These openings 40 are arranged to introduce stream 33c in an annular fashion about the central axis of the burner 9. The openings 40 themselves consist of at least two symmetrically opposed openings, and preferably more, and are arranged to eject the multiplicity of streams comprising 33c in order to produce a strong tangential component and a weak axial component.

Referring now to FIG. 4B, which illustrates a section of a preferred construction for the modified burner of FIG. 3 as shown in FIG. 4A, it can be seen that stream 33c is directed tangentially to the central axis of the burner (angle $\beta=90$ degrees). Referring to FIG. 4A it can be seen that stream 33c is directed to produce a weak axial component (angle $\alpha$ is less than 90 degrees and generally less than 45 degrees).

Referring again to FIG. 4A, oxygen stream 33d is also admitted directly, without mixing into a component of the recycle stream, through the overfire registers 14.

Referring to FIGS. 4A and 4B, the multiplicity of individual oxygen jets at openings 40 at the termination of stream 33c serve to complement the swirl induced within the overall flame envelope by the action of the swirl inducing devices, which in this embodiment are secondary registers 11a and the tertiary registers 13a. The momentum of the multiplicity of oxygen jets at openings 40 comprising stream 33c is related to the size, direction and relative amount of oxygen dedicated to this stream, such characteristics being a part of the specific oxygen management strategy employed. The resulting momentum of the oxygen jets at openings 40 comprising stream 33c lies within an optimum range which will require to be determined for the specific application. If the resulting momentum is too high and/or the swirl is too great, oxygen will tend to spill out of the throat of the burner, which makes it difficult to shape the flame envelope in order to complete the combustion process. Conversely, if the resulting momentum is too low, and/or the swirl is too weak, oxygen will tend to mix prematurely within the flame envelope 37, which tends to diminish the potential for staging the admission of the oxidant. Such premature mixing of the oxidant leads to hot spots in the flame which may increase the thermal fixation of nitrogen oxide compounds and may additionally induce localized accumulations of slag on the burners 9 and within the furnace.

The preferred method of adding oxygen to the burners 9 and overfire registers 14 contributes to an improved oxygen management strategy wherein the availability of oxygen is at a minimum along the central axis 34 of the flame envelope 37 and rises to a maximum at the outer periphery 35 of the flame envelope 37.

Still referring to FIG. 4A, arrows 36 indicate the resulting gradient of oxygen available within the flame envelope when employing this improved oxygen management strategy.

The fact that the primary stream 8 is essentially devoid of oxygen by design results in this radial oxygen gradient as shown by the arrows 36, and leads to the creation of a stable oxygen deficient zone within the furnace along the central axis 34 co-incident with the axial admission of coal to the furnace in stream 8, while maintaining the maximum oxygen availability at the outer periphery 35.

An important aspect of the preferred oxygen management strategy of this invention is that the individual oxygen sources combine to form a radial gradient in the oxygen concentration within the flame envelope in such a way as not to destroy the fuel rich core of the flame. Further, the radial distribution of oxygen in the flame envelope can be varied by any one or more of the following: pre-mixing different amounts of oxygen into the secondary/tertiary streams; controlling the amount of oxygen delivered to and/or the number of jets utilized within the quarl; and varying the amount of oxygen delivered to and/or the number of jets utilized within the overfire system.

The above description of the typical design and construction of this embodiment of the invention does not exclude alternatives that differ in details such as orientation, disposition and/or number of oxygen pathways to and within the flame envelope 37. The person skilled in the art of burner design will appreciate that other arrangements may be used which include variations of the manner of combining the distribution of oxygen to streams 33a, b, c, d, the degree and relative direction of swirl induced by registers 11a and 13a, and the momentum of oxygen jets at openings 40 within the burner throat, for the overall benefit of shaping the flame envelope 37 while staging the availability of oxidant within the flame.

More specifically, according to the invention, this preferred oxygen management strategy can be applied regardless of whether the tangential component of the combined oxygen streams 33c is working with or against the swirl induced by either or both the secondary registers 11 and tertiary registers 13a.

Furthermore, according to the invention, this preferred oxygen management strategy can be applied to new round burner designs or to retrofit existing round burner designs that were originally designed for operation with air. In most such retrofit applications, the present burner designed for operation with air can be removed temporarily to permit the addition of the oxygen jets to the burner throat, then the existing burner can be replaced with little or no modification required to the burner hardware in order to adapt the burner to oxygen-fuel combustion.

An important advantage of this oxygen management strategy is that the outermost region of the flame envelope is rich in oxygen, such areas being in contact with the burner throat and the adjacent furnace walls. This effect raises the softening temperature of the ash constituents of the coal which in turn reduces the tendency for deposits to accumulate on the burner itself or on the furnace walls that are adjacent to the burner. This effect also extends to the operation of the overfire registers 14 to include an improvement in the ability to remove furnace wall deposits using conventional removal techniques.

A significant resulting improvement of this novel oxygen management strategy is the creation of a stable fuel rich core within the flame envelope. This fuel rich core can, furthermore, be arranged to encompass most if not all of the region involved in the devolatilization of the coal which leads to optimum conditions for the limitation of the formation of nitrogen oxide compounds in burners that employ staging of oxidant admission to and within the flame envelope. In fact, it can be understood by those practised in the art of burner design that such conditions are also ideal for maximizing the reduction of nitrogen oxide compounds that are brought back to the flame within the recycled flue gas stream, further contributing to the deep staging possibilities of the preferred oxygen management strategy described of the invention.

The combination of the fuel rich core, oxygen rich periphery and the gradient of oxygen concentration available between the two contributes to the staged mixing of oxidant and fuel leading to a condition characterized by controlled but gradual mixing rates thereby minimizing hot spots in the flame envelope which could significantly augment the creation of nitrogen oxide compounds derived from thermal fixation mechanisms.

Still further, the preferred oxygen management strategy of this invention can be used alone or in combination with a preferred fuel introduction method that is particularly useful for the conversion of an existing furnace to oxygen-fuel combustion.

Figures 5A, 5B:
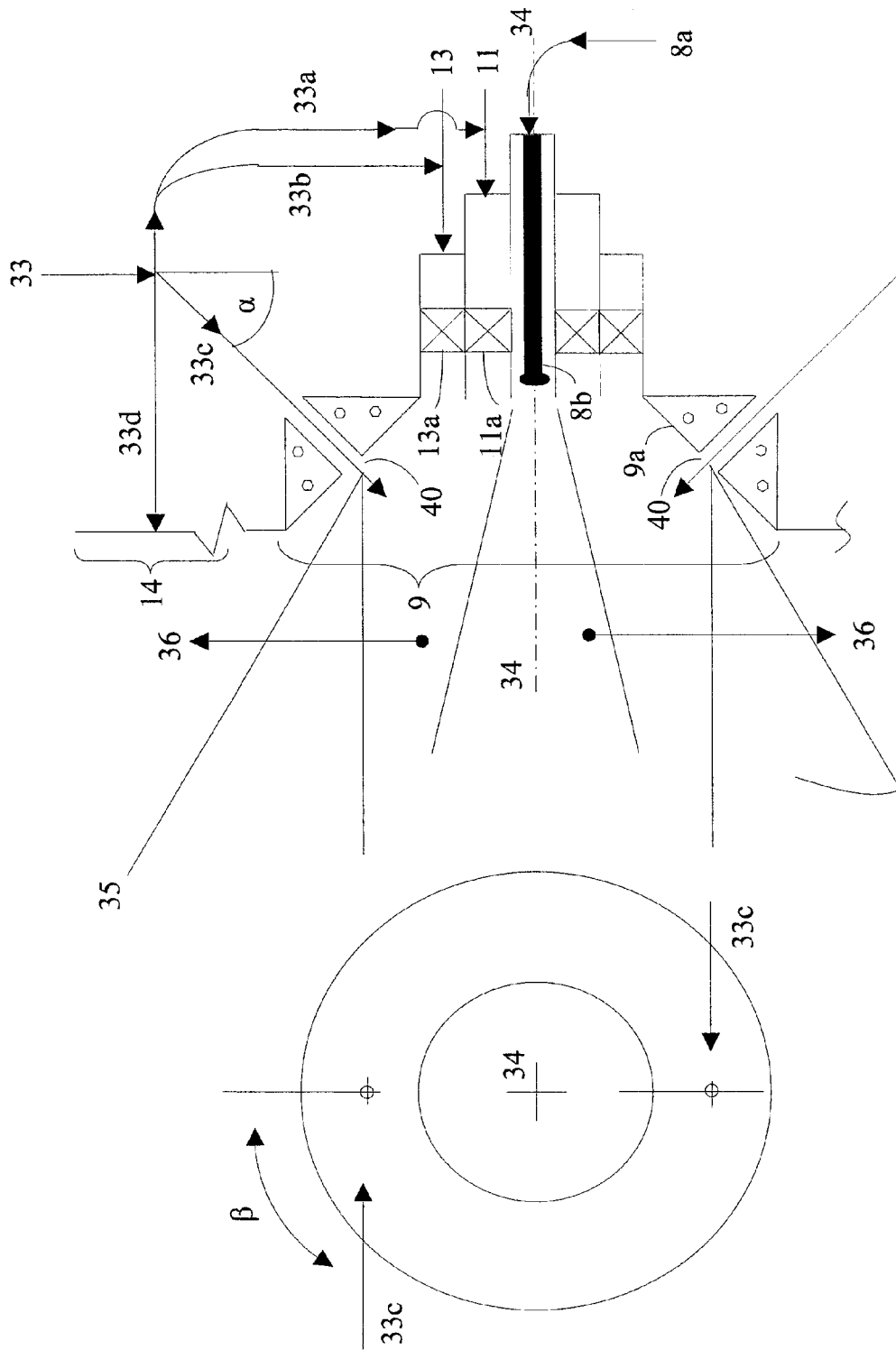
FIG. 5A is a schematic diagram of a preferred method for introducing fuel according to the invention.
FIG. 5B is a sectional view of the burner of FIG. 5A.

Referring now to FIGS. 5A and 5B, the preferred method of introduction of fuel according to this invention is shown schematically. In FIGS. 5A and 5B, the structure and arrangement of the elements is as in FIGS. 4A and 4B. However, FIGS. 5A and 5B differ from FIGS. 4A and 4B in relation to the operation of this embodiment of the invention, in showing the manner in which fuel is admitted to the flame.

Referring first to FIG. 5A, the coal (not shown) is prepared by any suitable means, and reduced to the desirable size which is conducive to firing in suspension within the furnace, the coal is mixed with condensates 28 (shown in FIG. 3) that have been previously extracted from the process. The resulting liquid/solid suspension can be referred to as a "coal-liquid mixture". In this way, it is no longer necessary to recycle the primary flue gas stream through the fuel preparation system to the furnace. Instead, the fuel can be conveyed to the center line 34 of the burner 9 as stream 8a, which consists of a coal-liquid mixture in which the liquid fraction consists mostly of water that has been condensed from the products of combustion as condensate 28. The carrier stream for the fuel is therefore largely composed of water in liquid phase rather than recycled flue gases which make up the primary stream 8 in FIG. 4A. Once inside the burner, the coal-liquid stream 8a is directed to the furnace in a line that terminates with a device 8b which serves to atomize and distribute the mixture centrally within the flame envelope.

The latent heat of evaporation of the carrier stream for the fuel is of great benefit to tempering the flame, and therefore can serve to replace the function of the primary flue gas stream in this regard.

This can lead to a reduction in the total amount of flue gas to be recirculated to the flame to accomplish the tempering action required, leading to significant capital and operational cost savings in such cases where these advantages can be exploited, for example, as would be the case for new construction or retrofit situations where the pulverizing equipment may be due for replacement.

This description of the typical design and construction of the invention does not restrict or exclude arrangements which may be used by one practised in the art of burner design, for example arrangement using multiple burners and/or multiple fuel preparation means.

Furthermore, the use of this invention is not limited to using liquids that are condensed from the process for the carrier stream in the coal-liquid mixture. Consequently, this preferred method of introducing fuel also includes the use of other readily available liquids, such as liquid phase condensates consisting mostly of carbon dioxide that can be recovered from the product recovery and compression train, such that the sensible and latent heat of the carrier stream can be applied effectively to achieving the degree of tempering required.

Furthermore, the use of this invention is not limited to using coal as fuel, but also includes all hydrocarbon feedstocks, whether naturally occurring or manufactured, where they can be prepared as a fuel-liquid mixture that can be pumped to the burner, such mixtures specifically including all manner of oil-water emulsions, petroleum coke preparations and mixtures made from coal preparation plant and/or coal washing plant wastes.

Figures 6A, 6B:
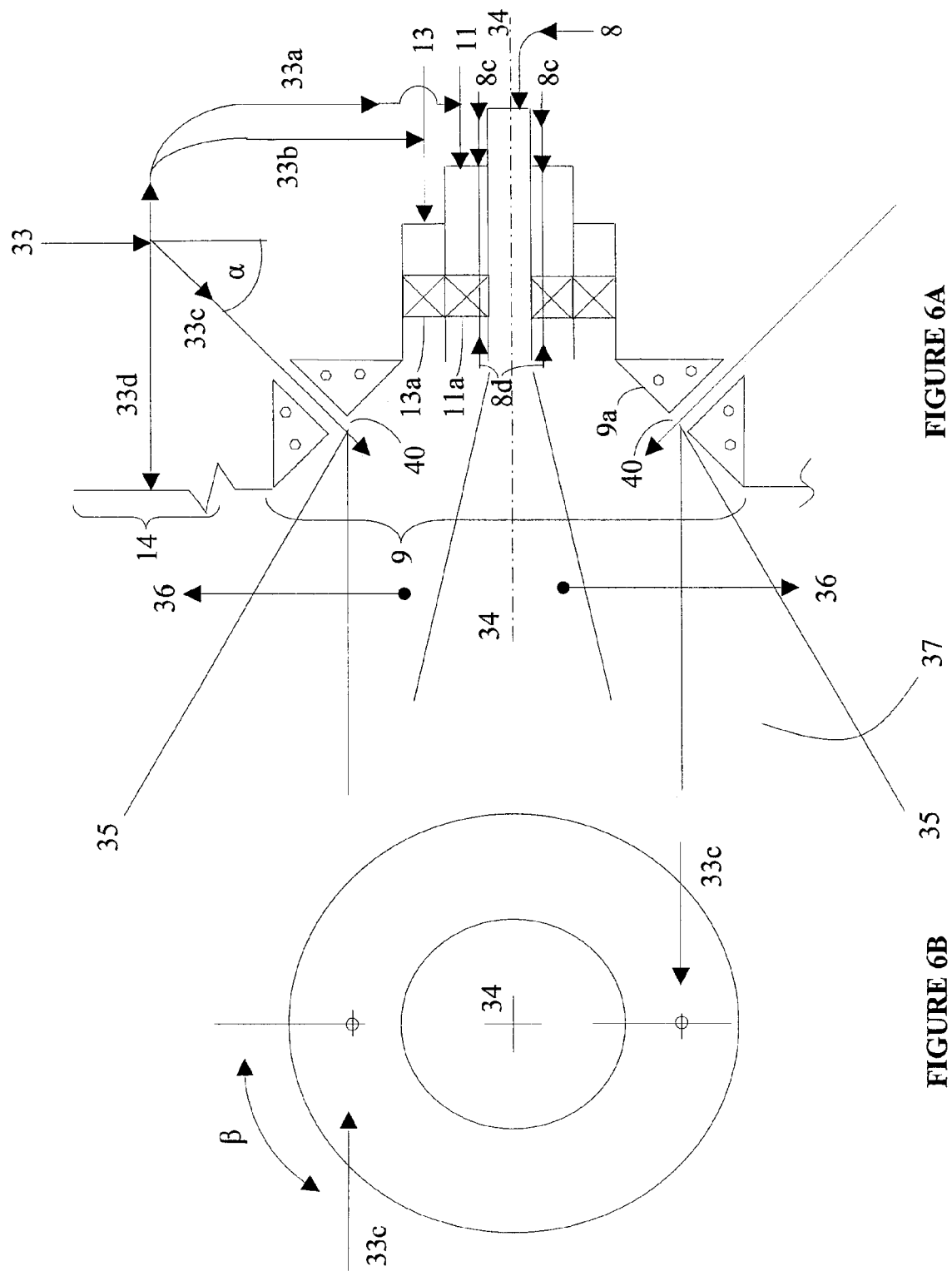
FIG. 6A is a schematic diagram of a preferred method for accomplishing start-up and part load operation according to the invention.
FIG. 6B is a sectional view of the burner of FIG. 6A.

Referring now to FIGS. 6A and 6B, a preferred method for accomplishing start-up and part-load operation according to the invention is shown schematically. In FIGS. 6A and 6B, the structure and arrangement of the elements is as in FIGS. 4A and 4B, and 5A and 5B. However, FIGS. 6A and 6B differ from FIGS. 4A and 4B in showing the manner of start-up and part-load operation.

Referring to FIG. 6A, start-up is accomplished by firing a gaseous or liquid auxiliary fuel in lines 8c while admitting air through the appropriate burner registers 11a. Auxiliary fuel is therefore fired in air independently of the main fuel during the start-up sequence, limited only by the allowable heat input for the auxiliary air register.

In this way, it is possible to purge the furnace and boiler passages by accomplishing an adequate number of volume changes using air prior to light-off of the auxiliary burner in order to purge the boiler of combustible gases which may have accumulated.

Once stable operation of the boiler has been achieved using auxiliary fuel, coal firing can be initiated using an oxygen lean stream of recycled flue gases to dry and convey the coal to the furnace through the pulverizers 2 (shown in FIG. 1).

During the onset of the addition of main fuel, whether coal or another fuel, to the furnace, the preferred oxygen management strategy pre-mixes all of the oxygen for the main fuel into the tertiary registers 13a and then the secondary registers 11a which are subsequently served with recycled flue gases.

Main fuel light-off is effected at a reduced fuel throughput while maintaining sufficient ignition and stabilization energy from either the auxiliary fuel input to the burner 9 being brought into service or from adjacent burners 9 if they are already lit and correctly disposed to assist with the light-off of the particular burner 9 being brought into service.

Once stable operation of the main fuel is achieved on the burner 9 being brought into service, which can be characterized by an attached flame front and good overall combustion of the main fuel, the main fuel throughput to the burner being brought into service can be increased gradually while the preferred oxygen management strategy ramps the oxygen input to the flame by premixing up to a fixed ratio of about 21% by volume (dry basis) of oxygen in the secondary/tertiary streams. Thus during this middle phase of coal addition to the furnace the throughput of recycle gas going to the secondary/tertiary registers is increasing in proportion to the amount of main fuel being fired.

At some point during the above described ramping of the main fuel, the capacity of the secondary/tertiary registers is reached and the final phase of the ramping of coal throughput to the burner 9 being brought into service is started by the direct injection of additional oxygen in relatively pure form to one or more of the jets in the throat of the burner 9, such jets being brought into service preferably in opposing pairs in order not to disrupt the shape of the flame unduly during this transition. During this final phase of the ramping of main fuel, the preferred oxygen management strategy ramps the direct injection of oxygen to the burner throat while the main fuel throughput is increased, until the overall capacity of the burner 9 being brought into service is attained.

This preferred method for accomplishing start-up and part-load operation thus provides an improved method for initiating and maintaining safe firing conditions during oxygen-fuel combustion by:

1) purging the furnace adequately with air prior to light-off of any fuel;
2) transitioning to operation of the auxiliary fuel register in air;
3) using oxygen deficient recycled flue gases or liquid carrier streams to convey the main fuel to the furnace;
4) limiting the pre-mixing of oxygen within secondary and tertiary streams to 21% by volume (dry basis) during start-up thereby creating an oxidant stream with properties similar to air;
5) injecting oxygen at the burner throat once the capacity of the registers to deliver the pre-mixed oxidant streams is reached; and
6) ramping the oxygen to the burner throat while allowing the oxygen that is premixed in the secondary/tertiary stream to rise to approximately 25% by volume (dry basis) until the maximum heat input of the burner is reached.

This manner of start-up thus allows for all steps in the progression to firing the main fuel to be accomplished without requiring the stoppage of the main fuel or auxiliary fuel at any point in the sequence in order to accomplish the safe admission of oxygen.

This preferred method for accomplishing start-up and part-load operation will be readily understood by operations personnel familiar with combustion processes using air as oxidant, thereby limiting the risk of incorrect operation leading to potentially unsafe firing conditions.

Of critical importance is that the oxygen management strategy permits the burner to be purged and fired with auxiliary fuel using air as oxidant. The main fuel, for example coal, is always handled in an oxygen deficient environment, thereby minimizing the potential for premature ignition of fuel and/or fires while the main fuel is being conveyed to the burner.

Furthermore, oxygen enrichment of recycled flue gases is limited to 21% by volume (dry basis) during start-up to match the characteristics of air as oxidant, assuring that the operator's experiences are transferable from air firing to oxygen firing during the critical phases of start-up.

Finally, the preferred oxygen management strategy respects the desire of most operators to establish aerodynamic stabilization of the flame by adjustments to the burner registers 11a and 13a while still allowing for the creation of deeply staged admission of oxidant to the flame through the maintenance of a fuel rich core and a radial oxygen gradient within the flame envelope that is controlled by the admission of relatively pure oxygen to the multiplicity of jets disposed within the throat of the burner.

We claim:

1. A method of introducing oxygen into a boiler system for combustion with a prepared fuel, the boiler system including a furnace comprising a combustion chamber having an outside wall with an intake region, at least one burner, a prepared fuel delivery means connected to the intake region, and a plurality of air stream delivery lines connected to the intake region adjacent and at least partly surrounding the prepared fuel delivery means, to provide a stream of flue gas, the method comprising
    (a) providing a plurality of swirl-inducing elements to the air stream delivery lines;
    (b) providing a plurality of oxygen delivery jets adjacent the intake region and substantially surrounding the air stream delivery lines;
    (c) igniting the fuel to create a flame having a flame envelope;
    (d) delivering a stream of oxygen through the jets tangentially to the flame envelope such that
        (i) the stream of oxygen substantially shapes and stabilizes a swirling flow field for the flame; and
        (ii) the oxygen concentration in the flame envelope gradually increases towards an outer periphery of the flame envelope.

2. A method as claimed in claim 1 wherein the furnace comprises a quarl region having a quarl surface, and in step (b) the jets are provided at the quarl surface.

3. A method as claimed in claim 2 wherein the fuel is pulverized coal delivered from a pulverizer.

4. A method as claimed in claim 3 wherein the pulverized coal is introduced to the furnace in a mixture with a carrier liquid having an evaporation point such that its latent heat of evaporation contributes to tempering of the flame.

5. A method as claimed in claim 4 wherein the carrier liquid is selected from a water-based liquid or a carbon dioxide-based liquid.

6. A method as claimed in claim 5 wherein the carrier liquid comprises condensates derived from the operation of the furnace.

7. A method as claimed in claim 3 further comprising the step of
    (e) selectively stopping feeding coal to the pulverizer and substantially simultaneously stopping delivery of oxygen to the quarl surface and delivering an oxygen deficient stream of a recirculated flue gas mixture to clear the pulverizer.

8. A method as claimed in claim 3 further comprising, before step (c), the step of (b.1) delivering a stream of an auxiliary fuel; and wherein step (c) comprises igniting the auxiliary fuel in air, and gradually introducing the coal to replace the auxiliary fuel.

9. A method as claimed in claim 2 wherein the air stream delivery lines comprise primary, secondary and tertiary lines, and step (a) comprises delivery of an oxygen deficient stream to the primary line, an oxygen enriched stream to each of the secondary and tertiary lines and pure oxygen to the quarl.

10. A boiler system for combustion of oxygen with a prepared fuel, the boiler system having a furnace comprising
    (i) a combustion chamber having an outside wall with an intake region, at least one burner;
    (ii) a prepared fuel delivery means connected to the intake region, and a plurality of air stream delivery lines connected to the intake region adjacent and at least partly surrounding the prepared fuel delivery means, constructed and arranged to provide a stream of flue gas to create a flame envelope when ignited;
    (iii) a plurality of swirl-inducing elements to the air stream delivery lines; and
    (iv) a plurality of oxygen delivery jets adjacent the intake region and substantially surrounding the air stream delivery lines, constructed and arranged to deliver oxygen tangentially to, but within an outer periphery of, the flame envelope to substantially shape and stabilize a swirling flow field for the flame, wherein the oxygen concentration in the flame envelope gradually increases towards the outer periphery.

11. A boiler system as claimed in claim 10 wherein the furnace further comprises a quarl region having a quarl surface and the plurality of oxygen delivery jets are provided at the quad surface.

12. A boiler system as claimed in claim 11 wherein the air stream delivery lines comprise primary, secondary and tertiary lines, and the primary line is constructed and arranged to receive an oxygen deficient stream, each of the secondary and tertiary lines is constructed and arranged to receive an oxygen enriched stream, and the quarl is constructed and arranged to receive pure oxygen.

* * * * *